April 11, 1939. W. H. HENDRICKS 2,153,559
VALVE
Filed Aug. 8, 1934 6 Sheets-Sheet 6

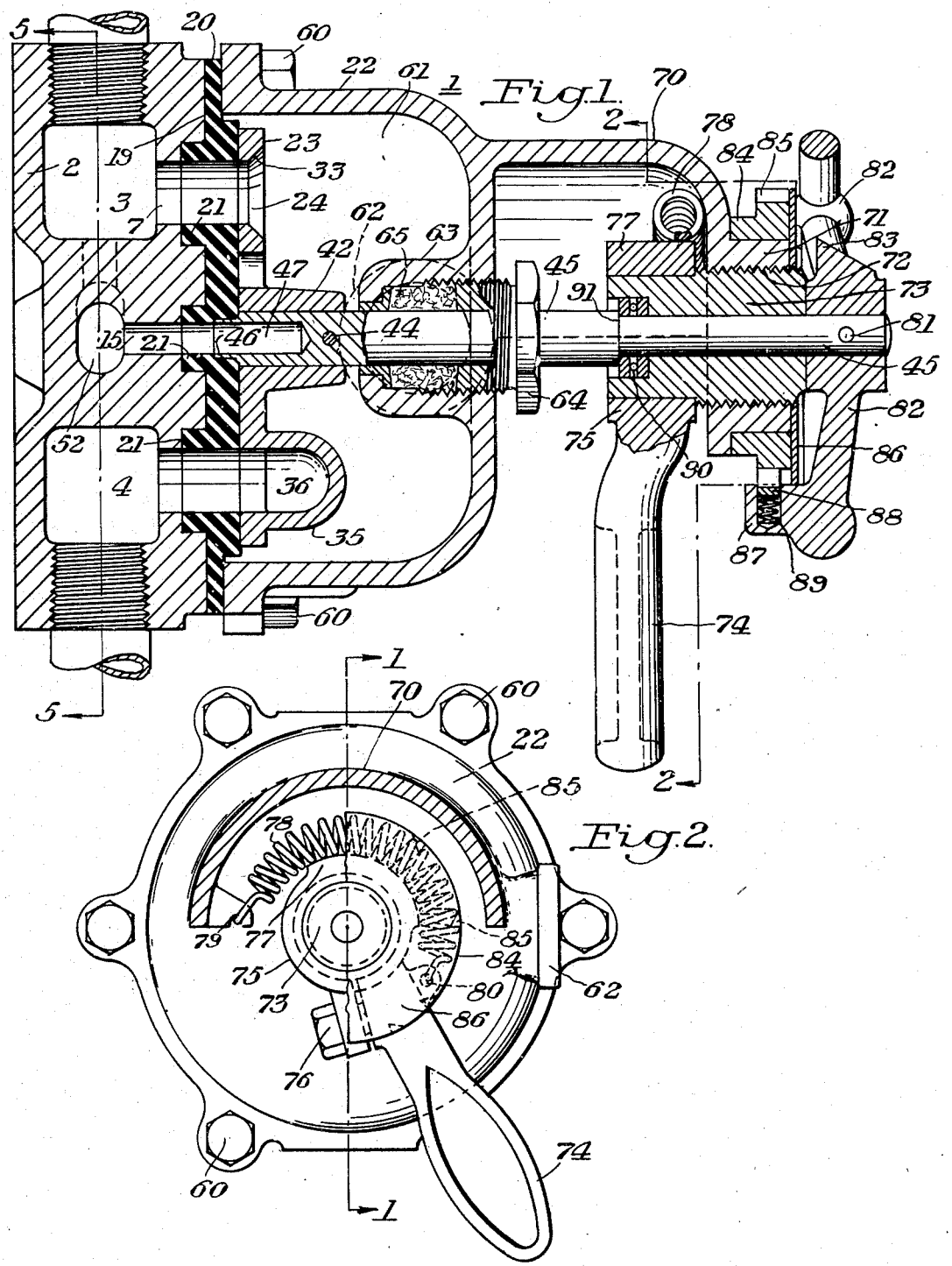

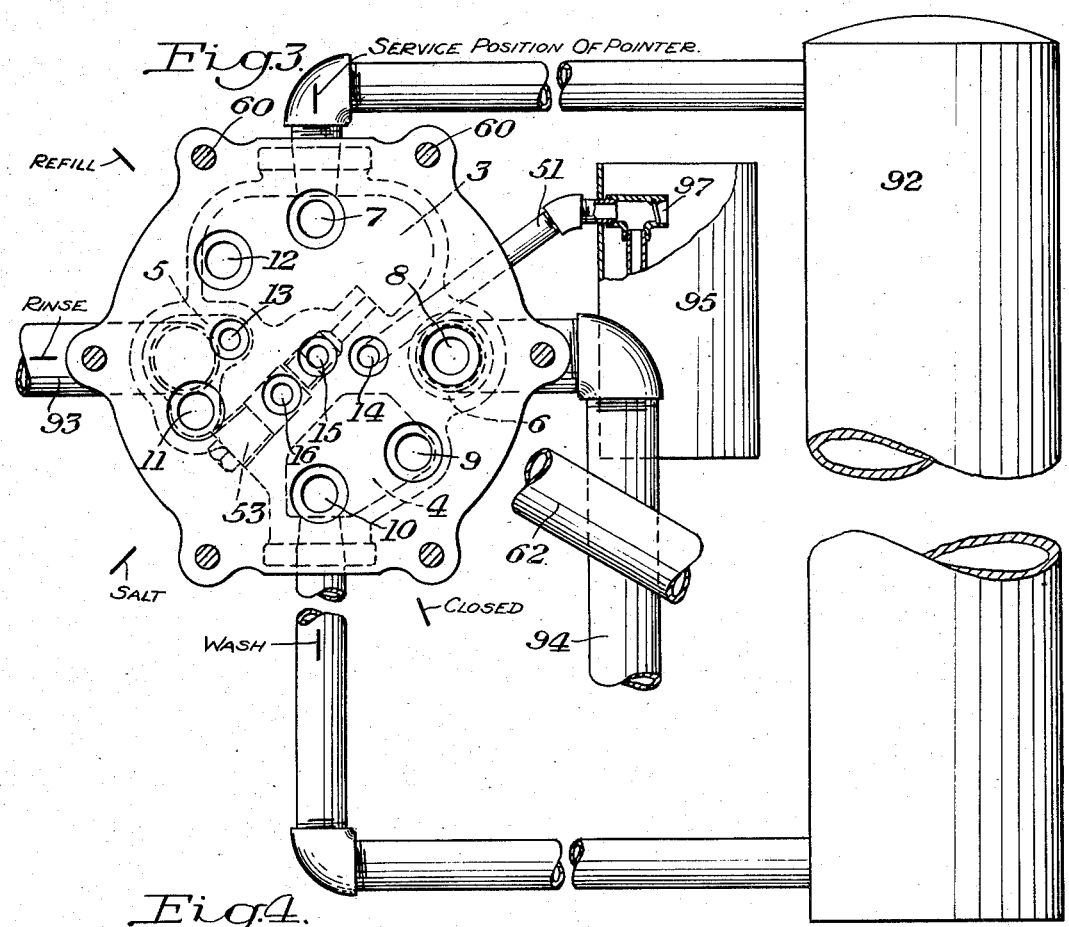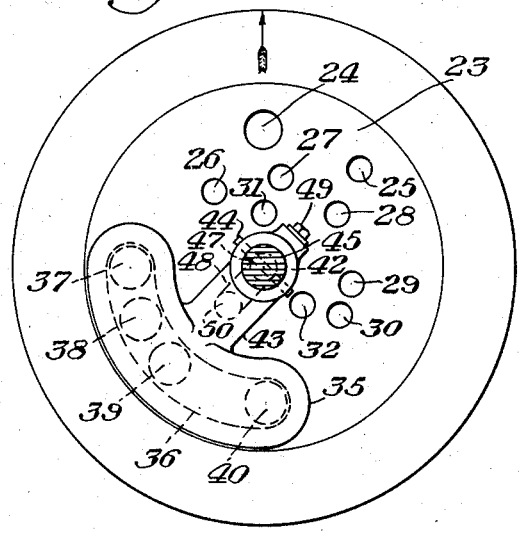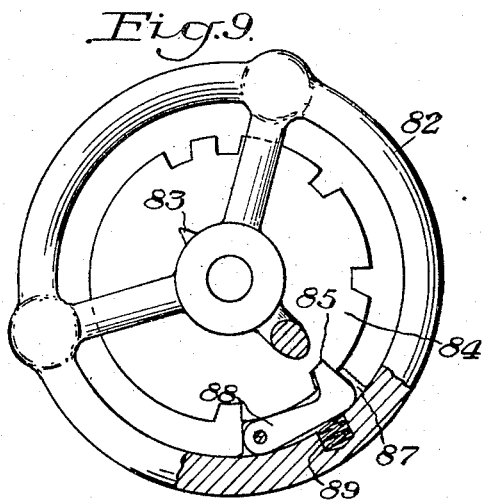

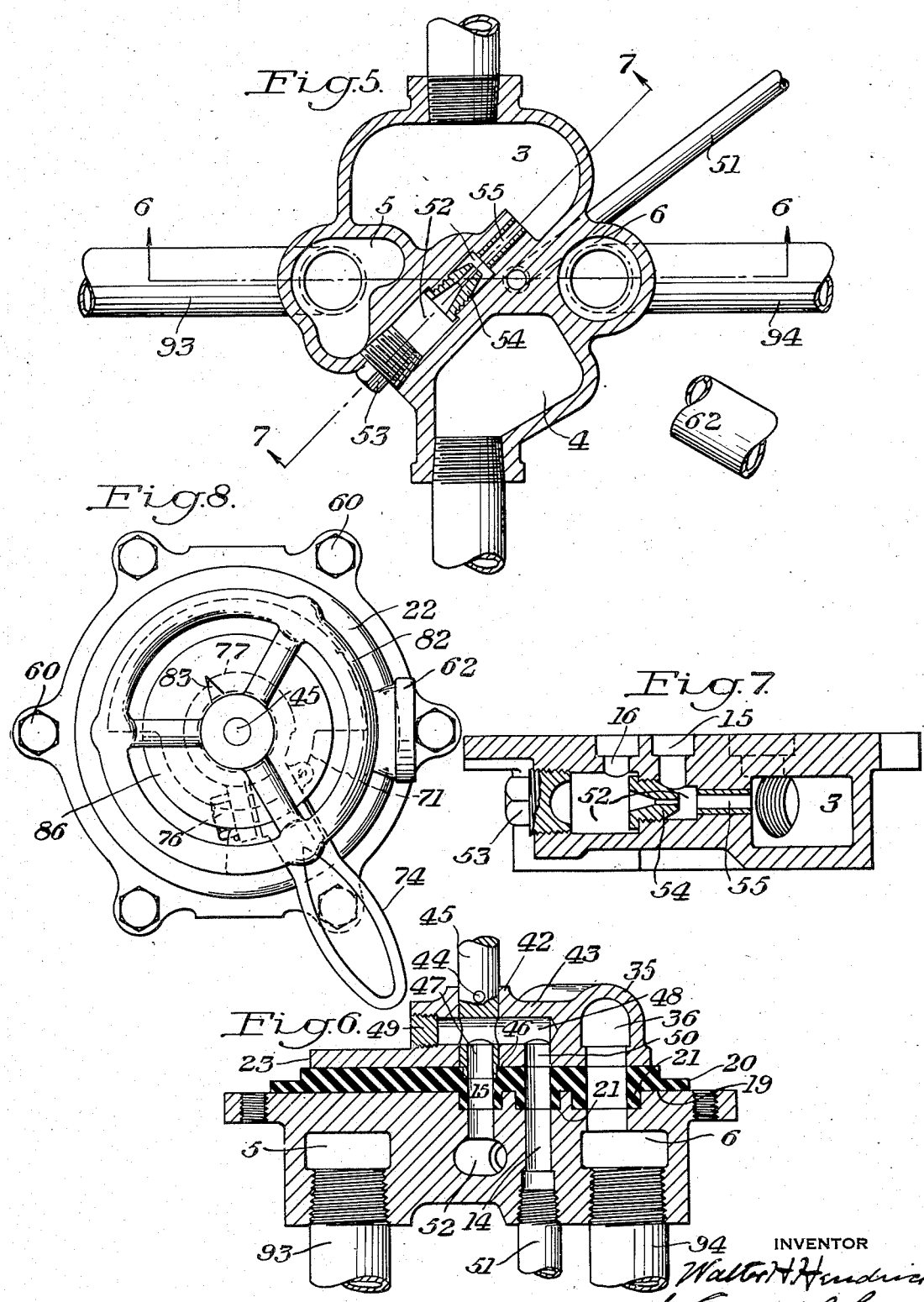

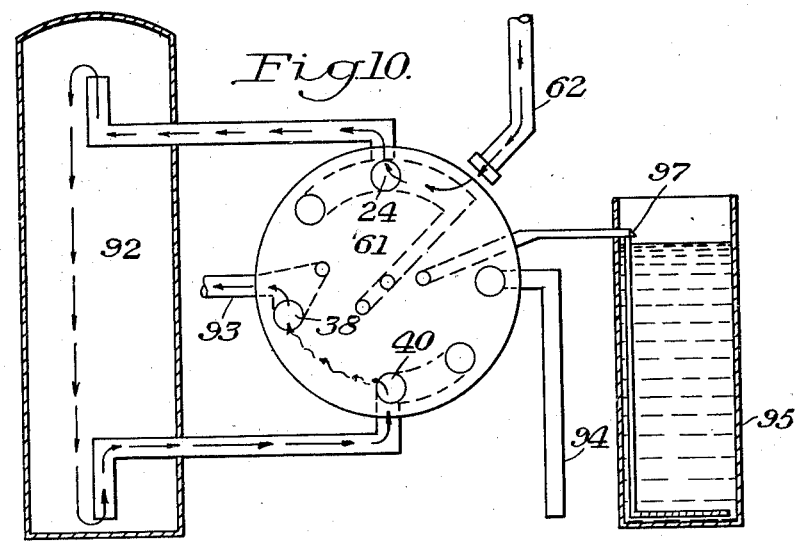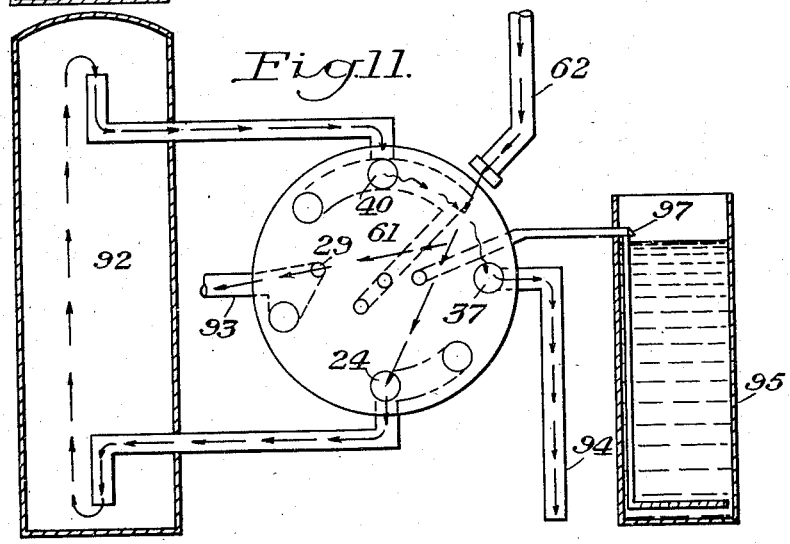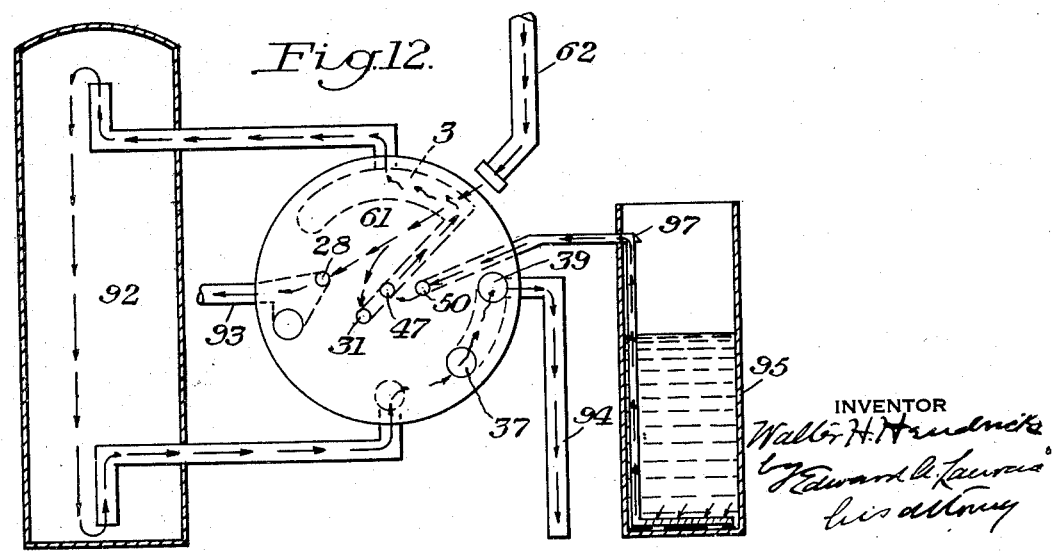

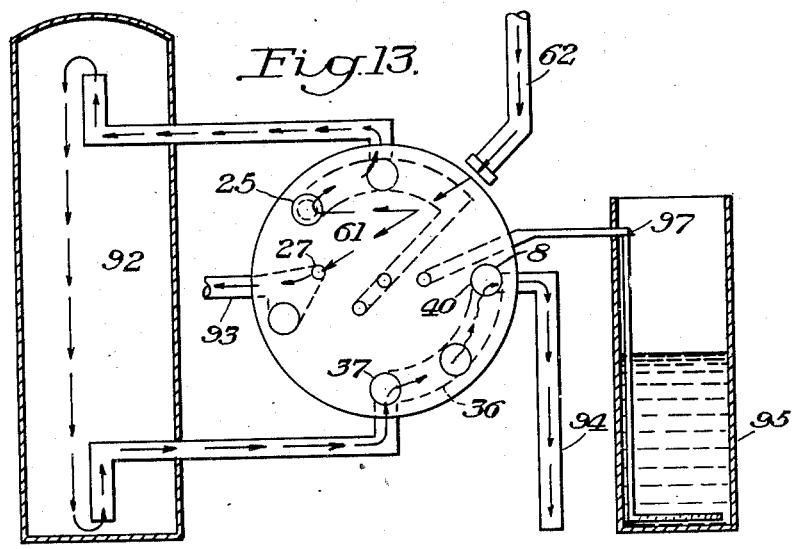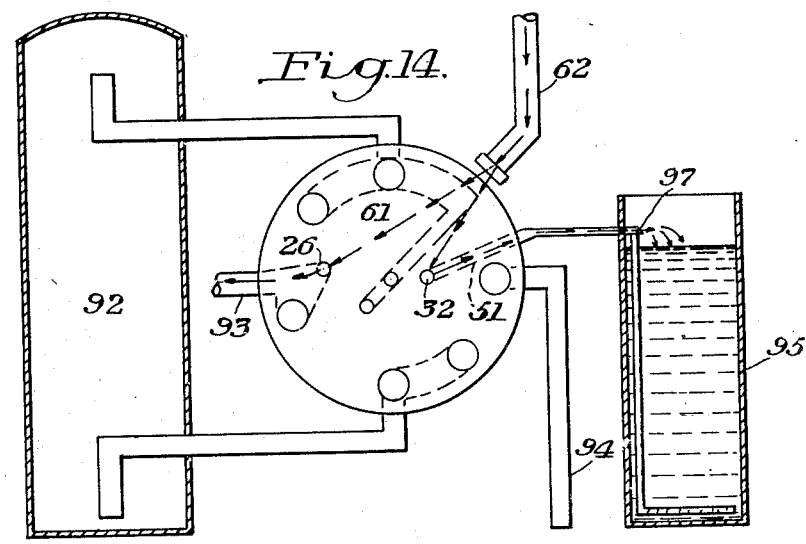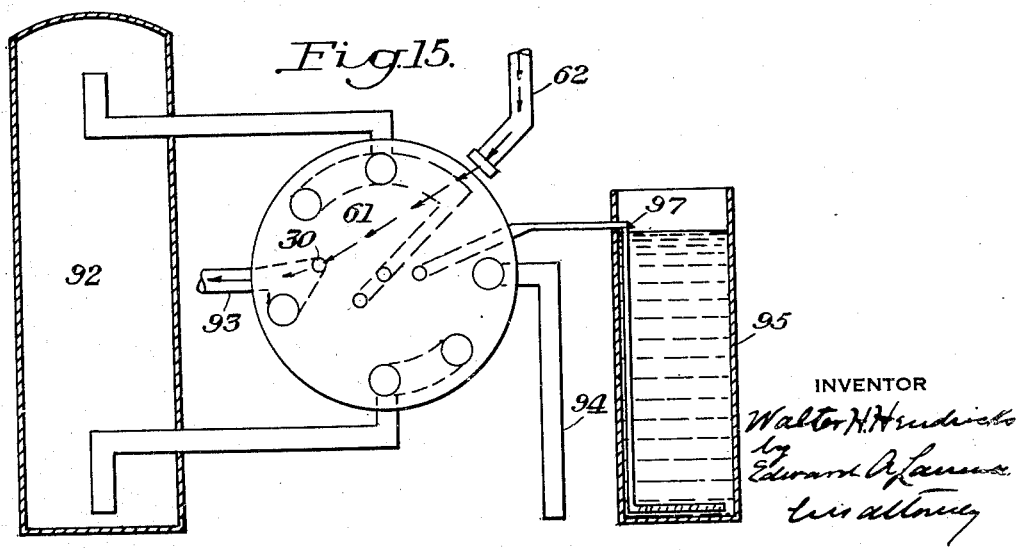

INVENTOR
Walter H. Hendricks,
by Edward A. Lawrence,
his attorney.

UNITED STATES PATENT OFFICE 2,153,559

VALVE

Walter H. Hendricks, Oakmont, Pa., assignor to Wm. B. Scaife and Sons Company, Oakmont, Pa., a corporation of Pennsylvania Application August 8, 1934, Serial No. 738,977

14 Claims. (Cl. 251—84)

My invention relates to valves and more particularly to valves of the rotary multi-port type for controlling fluids.

Such valves find extensive use for manual or automatic control of water softening operations in a system comprising a water softener device and means for regenerating the softener material therein. While heretofore the number of operations which could be controlled by a single rotary valve mechanism have been limited, my valve provides for control of all of the operations necessary to be performed in such a system including shutting off the softener from the service line after its softening properties have been greatly reduced, washing the softener, treating the softener material with brine to regenerate it, rinsing the brine from the regenerative material, refilling the brine reservoir, and reconnecting the service to the softener line.

While other systems usually require the shutting off of service during the regenerating operations or the use of special apparatus in addition to the valve for continuing service flow my valve may be designed, if desired, to by-pass hard water from the line through the valve itself to the service line during all of the stages of regeneration, or if desired to a limited number of such stages. It may also, if desired, be designed to keep the service port closed until all of the stages of regeneration have been completed.

Any of these operations may be effected without change in my standard valve body construction merely by the substitution of a valve rotor member having the proper port arrangements. Where it is desired to supply treated water continuously to the service line the rotor member is made without the by-pass ports and two or more softeners and valves are employed so that one at least may feed service while another is being regenerated. This obviates the necessity of employing special valves at increased cost to cut off flow from each of the softeners to service while the softener is being regenerated.

My valve also involves many important and advantageous features in valve structure which overcome many serious defects in existing valve structures. In the prior art the rotor member of the valve, usually of metal, engages directly a metallic seat, resulting in the scoring of the surfaces of the rotor and the valve seat due to the accumulation of sediment between them, or if an inflexible gasket were used the rotor when lifted therefrom would frequently deposit a sediment of rust on the valve seat together with other sediment incident to the valve operation. Consequently when the rotor was again seated leakages occurred. Furthermore, as heretofore provided, the ports of the rotor member terminated in ring-like projections which cut into the seat to make a tight seal and since it was necessary to design the valve so that when the rotor was turned there would always be projections corresponding to the indentations in the seats in order to secure a fit between the rotor and seat, these indentations caused a wearing of the gasket which soon resulted in leakage.

By my construction I avoid entirely these defects in prior constructions. This I accomplish by providing a gasket having a plain surface throughout without indentations and a rotor with its seat-engaging surface also entirely plain and without the ring projections of the prior art, and further provide means for limiting the lifting of the rotor from the gasket to an extent necessary to free it sufficiently to permit rotation but not sufficiently to separate the surfaces of the rotor and gasket substantially from each other. By this construction I avoid entirely the possibility of the precipitation of sediment between the rotor and gasket or the formation of indentations in the gasket requiring rings on the rotor to seat in each indentation in each operative position of the rotor in order to prevent leakages through the indentations. On the other hand since my construction involves only plain surfaces the rotor will properly seat without leakage on the gasket in any position, and I am thus enabled to locate my ports in the rotor and seat in staggered or in geometrical irregular relation, such as different radial distances from the center of rotation, that may be desired. I am thus enabled to multiply the number of flow controls in the valve in any manner effecting the efficiency of the valve operation.

My invention further contemplates the use of a flexible gasket of relatively soft rubber or the like which will respond to the pressure of the fluid in a port through the valve seat and gasket to cause the periphery of the port in the gasket to be pressed against the surface of the rotor to prevent leakage, much as an inner tube is pressed by pressure against the tire casing. Furthermore, to enhance the sealing effect I preferably provide tubular projections from the gasket which constitute extensions of its ports into the ports of the valve seat, which projections are likewise forced by fluid pressure into close engagement with the sides of the ports in the seat, preventing any leakage at this point.

Where, as in my preferred construction herein disclosed, I provide a central port for the brine which opens into a similar port and passageway through the stem of my rotor member a further feature of my invention contemplates providing the corresponding port of the gasket with a flexible tubular projection similar to that previously described and into this tubular projection I extend the rotor stem below the rotor plate a distance sufficient to prevent its removal from the tubular projection when the rotor is eased off its seat, thus preventing at all times leakage from the brine passages to the service flow or vice versa.

My rotor is preferably provided with a housing having passageways with ports through the rotor but not into the bonnet or main chamber of the valve body, certain of said passageways being employed for the brine flow and other independent passages being employed for reducing the number of ports necessary in the valve base, facilitating the control of a multiplicity of flows through a single rotary valve structure.

This arrangement also permits me to locate the brine injector in the base or back plate which provides a valve seat and this in turn permits the injector to be reached by a straight bore in the base casting leading directly to the injector and closed at its outer end by a removable plug, which construction permits the ready cleaning of the injector.

My invention contemplates means whereby the rotor may be eased off its seat without shutting off the water pressure preliminary to indexing, means whereby the rotor member is automatically returned to its seat when the means for easing it off its seat to permit turning is released by the operator, and further contemplates means for holding it against being lifted by pressure after it has been returned. Preferably the indexing mechanism is operable in one direction only to prevent inadvertent repetition of stages.

Since the water pressure is almost equal to the sealing pressure the rubber gasket will not be raised up in a stem plate port but will rather have a tendency to concave in the port hole, thus facilitating turning of the rotor.

Other novel features and advantages of my invention will hereinafter appear.

In the accompanying drawings showing for purpose of exemplification; but without limiting my invention or claims thereto, certain practical embodiments of the principles of my invention:

Fig. 1 is a vertical section of my valve through the axis of rotation.

Fig. 2 is a top plan view partially in section on the line 2—2 of Fig. 1.

Fig. 3 is a top plan view partially diagrammatic of the base portion of my valve with the flow connections to the softener and regenerator.

Fig. 4 is a top plan view of the rotor body member.

Fig. 5 is a horizontal section through the base member on the line 5—5 of Fig. 1.

Fig. 6 is a vertical section through the base member and valve body on the line 6—6 of Fig. 5.

Fig. 7 is a vertical section through the base member on the line 7—7 of Fig. 5.

Fig. 8 is a top plan view of the valve.

Fig. 9 is a top plan view of the indexing wheel with a part broken away and index plate removed to show the pawl for locating the rotor at the proper station.

Figs. 10 to 15 inclusive are flow diagrams showing, respectively, connections for normal flow, the washing operation, the regenerating operation, the rinsing operation, refilling the brine tank and cutting out the softener system while permitting flow from the supply to the service line.

Figure 16:
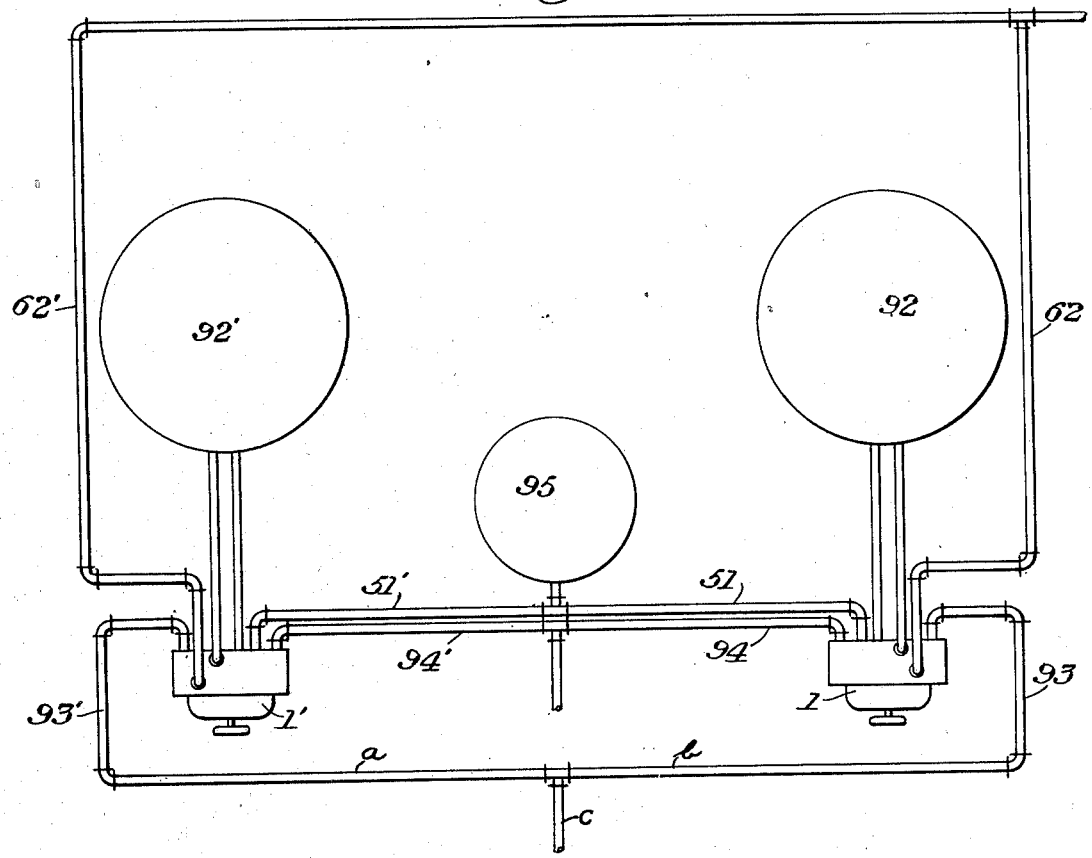
Figure 17:
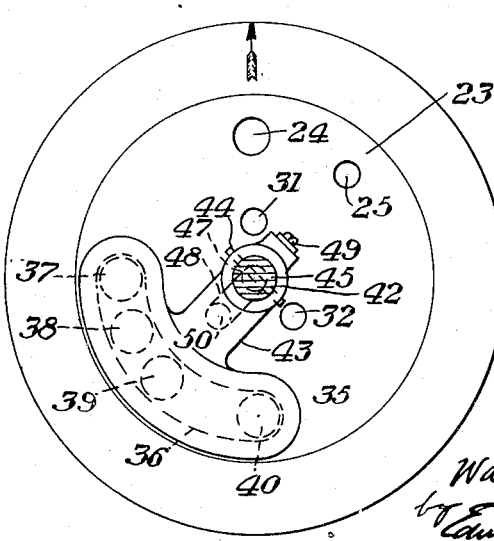

Figs. 16 and 17 are, respectively, a diagrammatic view of a system having a plurality of softeners for continuous feed of treated water and a plan view of the valve rotor used therein.

Referring to the drawings, the valve 1 is shown as provided with a base or back plate 2 provided with chambers 3, 4, 5 and 6 connected with the top of the softener tank, the bottom of the tank, to the service outlet and to the drain respectively. Ports 7, 8, 9, 10, 11, 12, 13, 14, 15 and 16 lead from these chambers through the valve seat 19 and gasket 20.

The gasket 20 is preferably of flexible material, such as soft rubber, and preferably provided with projections 21 extending into the port through the valve seat. This gasket may conveniently extend between the base or back plate 2 and the bonnet 22, or if preferred separate gaskets may be used for the valve seat and for the casing parts respectively. The gasket is advantageously provided with a plan smooth face on which is adapted to be seated the stem plate member 23 of the rotor, also preferably provided with a plain face.

The stem plate member is provided with ports 24, 25, 26, 27, 28, 29, 30, 31 and 32 adapted to aline in its several positions with corresponding ports through the valve seat. These ports are preferably beveled, as shown at 33 to deflect a portion of the flow of the fluid in such direction as to maintain the port orifice clean and free from sediment.

The stem plate member is provided with a housing 35 closed at its top and ends and provided with a continuous passageway 36 from which lead ports 37, 38, 39 and 40 through the stem plate. The stem plate is provided with the raised collar 42 preferably integrally connected with the housing 35 by the branch housing 43 and extending through the collar and attached thereto by the pin 44 is the stem plate shaft 45 whose lower reduced extremity 46 is extended beyond the bottom of the stem plate and seated in a corresponding recess in the gasket a sufficient distance to prevent its separation from the gasket when the valve is eased off its seat. The lower end of the shaft and its extension is bored out to provide a duct 47 leading to a corresponding duct 48 bored in the branch housing, one end of the latter duct being closed by the screw plug 49 and its other end communicating with the port 50 leading through the valve seat to the port 14 in the back plate, and thence communicating through the duct 51 with the brine tank. The port 15 communicates with a chamber 52 formed in the base or back plate member, the outer end of the chamber being closed by a screw plug 53. Leading from the bonnet chamber through the gasket and back plate is the ported duct 16 between which and the ported duct 15 is located the brine injector 54 adapted to discharge through the throat 55 into the back plate chamber 3. The bonnet 22 is secured to the back plate by the screws 60, the chamber 61 in said bonnet above the stem plate being supplied with hard water from the source of supply 62 at all times. The bonnet is provided at its outer end with a bearing 63 for the stem plate shaft, which bearing is provided with a packing nut 64 and packing 65.

Preferably cast integral with the bonnet is a bearing supporting member 70 provided with a bearing 71 provided with left handed screw threads 72 to receive the correspondingly threaded jack screw 73 provided with a handle 74 rigidly attached thereto by a split collar 75 integral with the handle and a screw 76 for clamping it to the jack screw, the jack screw being rotatable freeely about the valve shaft 45 which passes therethrough.

The collar is provided with a raised portion 77 which affords a bearing for the spring 78 attached at 79 to a fixed part of the valve casing and at its other end 80 to the handle 74, the spring being always under tension to cause the handle to move the jack screw counterclockwise to seat the valve plate 23 against the gasket 20 whenever the handle is released, there always being sufficient tension in the spring to insure such seating regardless of wear or the change in adjustment of parts.

Attached to the outer end of the stem valve shaft 45 by a pin 81 is the index wheel 82 provided with a pointer 83 and surrounding the bearing 71 is fixedly attached an index plate 84 provided with notches 85 corresponding in position and number to the respective flow connections which the valve is designed to establish. Above the index plate and preferably extending to the outer edges of the notches 85 to conceal them is the index disk 86 fixedly secured in place and over which the pointer 83 is adapted to be moved to the desired position designated on the disk. Conveniently projecting from and integral with the index wheel is a lug 87 recessed to receive a pivoted pawl 88 biased by the spring 89 into engagement with the notches 85 to hold the valve stem plate in the desired position indicated by the pointer 83. Either one side of each of the notches 85 or one notch engaging surface of the pawl is beveled to permit free rotation in one direction but not in the other, although it is obvious that this feature may be varied to permit rotation as desired.

The jack screw 73 bears at its upper end against the hub of the index wheel 82 and at its lower end against ball bearings 90 seated against a shoulder 91 formed on the stem plate shaft 45.

When it is desired to operate the valve to change its port connections the handle 74 is first rotated manually clockwise through a short arc against the tension of the spring 78, which in turn rotates the jack screw 73 fixed thereto through the same arc and since the latter is provided with a left handed thread it will rise in its bearing pressing against the bottom of the hub of index wheel 82 which by reason of its pin connection to the stem plate shaft 45 lifts the stem plate sufficiently to ease it off the gasket and permit its turning without permitting leakage between it and the gasket. The operation of the handle 74 effects no rotation of the stem plate for the reason that the jack screw 73 is freely rotatable about the shaft. While the jack screw is easily rotated by the lever 74 and spring 78, it is unaffected by the fluid pressure on the valve plate because the latter is applied substantially at right angles to the screw threads. When the valve has been eased from its seat as indicated, the index wheel may be turned clockwise to the desired full position and since this wheel is rigidly connected through the pin 81, shaft 45 and pin 44 to the stem plate, the stem plate and its ports will be correspondingly moved to the desired port position.

Fig. 10 shows the normal flow position of the valve parts in which the water enters through the supply duct 62 into the bonnet chamber 61 and from thence flows through the stem plate port 24, seat port 7, chamber 3 to the top of the softener, 92, through the softener and from the bottom of the softener 92 to the chamber 4, thence through the seat port 10, the stem-plate housing port 40, passage 36, and housing port 38, seat port 11, into the chamber 5 and from thence to the service outlet 93.

Fig. 11 shows the flow connections for washing the softener, the water passing from the inlet 62 to bonnet 61, stem plate port 24, seat port 10, chamber 4, to the bottom of the softener, thence to the top of the softener to the chamber 3, seat port 7, stem plate port 40, housing passage 36 and port 37, seat port 8 to chamber 6 and drain 94. Water is by-passed during this operation from bonnet chamber 61, stem plate port 29, seat port 13 to service outlet 93.

Fig. 12 shows the flow connections for regenerating the softener, the flow being from the source of supply 62 to bonnet chamber 61, stem plate port 31, seat port 16, to base chamber 52 through the injector 54, throat 55, chamber 3, to the top of the softener, through the softener from the bottom of the softener to chamber 4, seat port 9, stem plate port 37, housing passage 36, stem plate port 39, seat port 8 to drain 94. The injector creates a fall in pressure which causes the brine to flow from the brine tank 95 through the ports 14 and 50 (Fig. 6), passage 48, ports 47 and 15, chamber 52 and from thence is carried by the water to the drain. Hard water during this period is by-passed from the bonnet chamber 61 through the stem plate port 28 to service outlet 93.

Fig. 13 shows the flow for the rinsing operation, the water entering from the source of supply into the bonnet chamber 61 and from thence passing through stem plate port 25, seat port 12, chamber 3 to the top of the softener, through the softener from its bottom to chamber 4, seat port 10, stem plate port 37, passage 36, stem plate port 40, seat port 8 to drain 94, hard water being by-passed as previously to the service outlet 93 through the stem plate port 27.

Fig. 14 shows the flow connections for refilling the brine tank, the flow being from the source to the bonnet chamber 61, stem plate port 32, seat port 14, pipe 51 to brine tank 95, the flow connection to the brine tank being provided with a valve 97 responsive to flow from the pipe 51 to pass water to the top of the brine tank but automatically closing when the brine is withdrawn therefrom. Water is by-passed as in the previous stages from the bonnet chamber 61 through the stem plate port 26 to the service outlet 93.

Fig. 15 shows the valve set to cut out the softening apparatus altogether while connecting the supply main to the service outlet through the bonnet chamber 61, stem plate port 30, to the service outlet 93.

When it is desired to operate several softeners to supply a continuous flow of treated water to the service line, as diagrammatically shown in Fig. 16, my standard valve body member may be provided with a rotor member, as shown in Fig. 17, which is similar to that shown in Fig. 4, except that the by-pass ports 26, 27, 28, 29 and 30 are omitted.

Fig. 16 shows a pair of softener tanks 92, 92'; valves 1, 1'; a single brine tank 95; supply conduits 62, 62'; service conduits 93, 93'; and drain outlets 94, 94'. When a softener tank is being regenerated it will be cut off from the service line c by the corresponding valve 1 or 1', thus obviating the use of special valves in branches a and b for this purpose, materially reducing costs.

While I have illustrated and described preferred forms of my invention, it will be understood that changes may be made in the forms and features disclosed, without departing from the spirit of my invention and that certain features may sometimes be used to advantage without a corresponding use of other features.

I claim:

1. In a valve of the class described, in combination: a valve base member; a flexible gasket on said base member expansible by fluid pressure in the valve and having a free flat face, said base member and gasket being provided with aligned ports, and said gasket being provided with tubular projections, forming continuations of its ports, extending into the ports in said base member, and a movable valve member provided with ports adapted to cooperate with the ports in said base member and gasket, said movable member having a flat face adapted to seat on said gasket.

2. In a valve of the class described, in combination: a valve base member; a flexible gasket on said base member expansible by fluid pressure in the valve, said base member and gasket being provided with aligned ports, and said gasket being provided with tubular projections, forming continuations of its ports, extending into the ports in said base member; and a movable valve member having a face adapted to seat on said gasket.

3. The combination defined in claim 2 in which the tubular projections closely fit the sides of the ports in the base member.

4. In a valve of the class described in combination: a valve seat provided with ports; a movable valve member adapted to engage said seat to control the flow through said ports, said ports being provided with flexible linings having their outer ends flush with the surface of said seat whereby pressure of the fluid within said ports will force said flexible lining into engagement with the sides of its ports and with said movable valve member to effect a seal.

5. In a valve of the class described, having a base member provided with a port and a movable port controlling member, in combination: a gasket adapted to seat on the base member, having a port therein adapted to align with the port in the base member; and a tubular projection forming a continuation of the port in said gasket adapted to extend into the port in the base member, said gasket and tubular projection being sufficiently flexible to permit the pressure of fluid in the port and in said tubular member to press said gasket and tubular member into close contact with the sides of the port in the base member and with the bottom of said movable port controlling member, respectively, to prevent leakage when the port is closed by said port controlling member.

6. In a valve of the class described, having a base member provided with a port and a movable port controlling member, in combination: a gasket adapted to seat on the base member, having a port therein adapted to align with the port in the base member; said gasket being sufficiently flexible to permit the pressure of fluid in its port to press its edges into close contact with the bottom of said movable port controlling member to prevent leakage when the port is closed by said port controlling member.

7. In a valve of the class described, in combination: a bonnet member provided with an inlet and main receiving chamber; a base member providing a valve seat and having ports and intermediate flow connections therein from and to said seat and a final outlet, and a movable valve member for controlling said connections, said valve member comprising a plate having a flat surface to engage said valve seat, an enclosed passage in said plate, and ports in the floor of said passage for connecting the ports in the base member.

8. In a valve of the class described, in combination: a valve base member; a flexible gasket on said base member, said base member and gasket being provided with aligned ports, and a movable valve member having a face adapted to seat on said gasket, said movable member being provided with a port or ports which in certain positions are adapted to align with a corresponding port or ports in the gasket and base member, said gasket being of a material which is expansible under fluid pressure in its ports to force the periphery or peripheries of its ports into liquid sealing engagement with the face of said movable member.

9. In a valve of the class described, in combination: a valve base member; a flexible gasket on said base member, said base member and gasket being provided with aligned ports, and a movable valve member having a face adapted to seat on said gasket, said movable member being provided with passageways in its interior communicating through ports passing through said face with corresponding ports in the gasket and base member, said gasket being of a material which is expansible under fluid pressure in its ports to force the periphery or peripheries of its ports into liquid sealing engagement with the face of said movable member.

10. In a valve of the class described, in combination: a valve bonnet member provided with an inlet and main receiving chamber; a valve base member having outlets and providing a valve seat and having ports and intermediate flow connections therein from and to said base member and to the outlets, a resilient gasket thereon having corresponding ports therethrough, and a movable valve member for controlling said connections, to effect any one of a plurality of different flows, including a bypass for hard water directly to the service outlet during any intermediate stage of operation, the ports in said valve member for bypassing the hard water in the successive stages being located in a circle about the center of said valve member and at a different radial distance from that of all other control ports in said valve member.

11. In a valve of the class described, the combination of a base member having a flat top surface, a flexible gasket substantially covering the top surface of said base member, said base member and gasket having aligned ports, tubular projections on said gasket forming continuations of the ports therein and extending into the ports in the base member, a movable valve member having a flat face adapted to seat on said gasket and having ports arranged to cooperate with the ports in the base member and gasket, and a bonnet seated on said gasket and secured to the base member to inclose the valve member.

12. A valve gasket comprising a flat disk having ports therethrough and tubular projections extending from one face of the disk and forming continuations of said ports.

13. In a valve of the class described, the combination of a valve body having a valve seat and provided with ports, a chamber in said body connected by a port with the valve seat, a second chamber in said body having connections to an exterior point of the latter, an injector in said body interposed between said chambers and arranged to inject water from the first chamber into the second chamber, a brine passage leading from a port in said body to the injector, and a movable valve member arranged to cooperate with said seat to admit water under pressure to the first chamber and brine to the brine passage.

14. In a valve, a valve housing, a valve seat therein having ports including an inlet port and a plurality of outlet ports, a valve disk movably engaging said seat and having passages for selectively connecting said ports, an injector in said housing communicating with certain of said seat ports, said disk in at least one position connecting said injector with said inlet port and one of said outlet ports and in another position closing communication between said injector and said ports, a straight passage in said housing aligned with said injector and extending to the exterior of said housing, and a removable plug in the outer end of said passage.

WALTER H. HENDRICKS.